PREPARATION OF p-NITRODIPHENYLAMINE

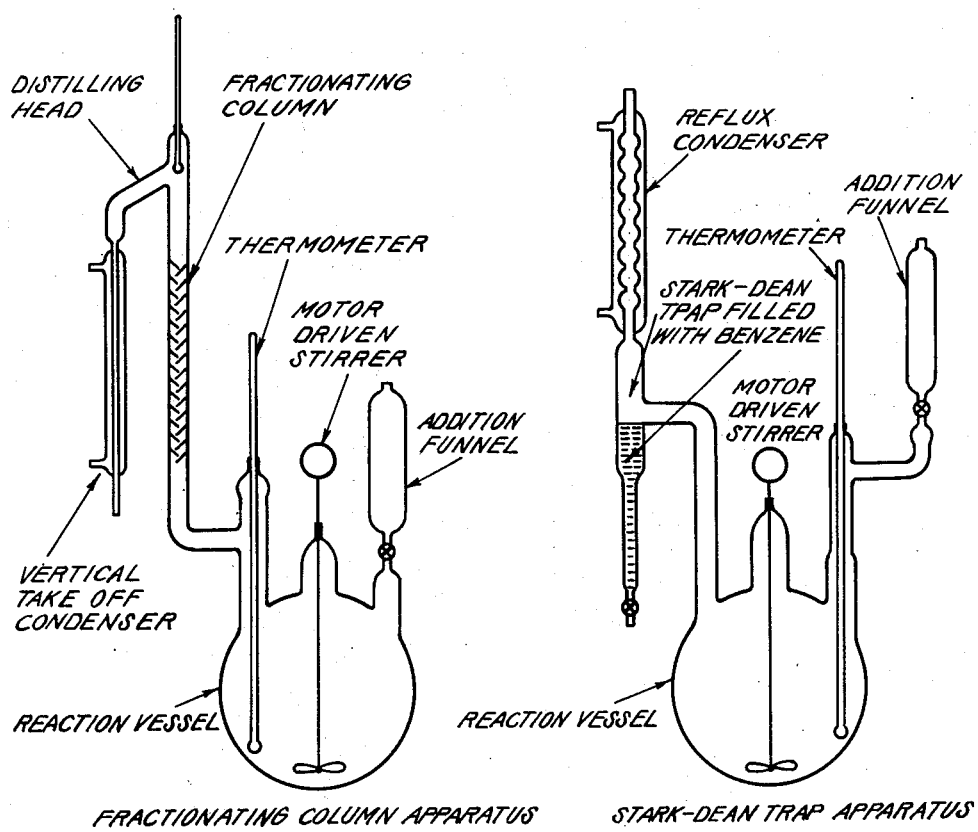
FRACTIONATING COLUMN APPARATUS
STARK-DEAN TRAP APPARATUS
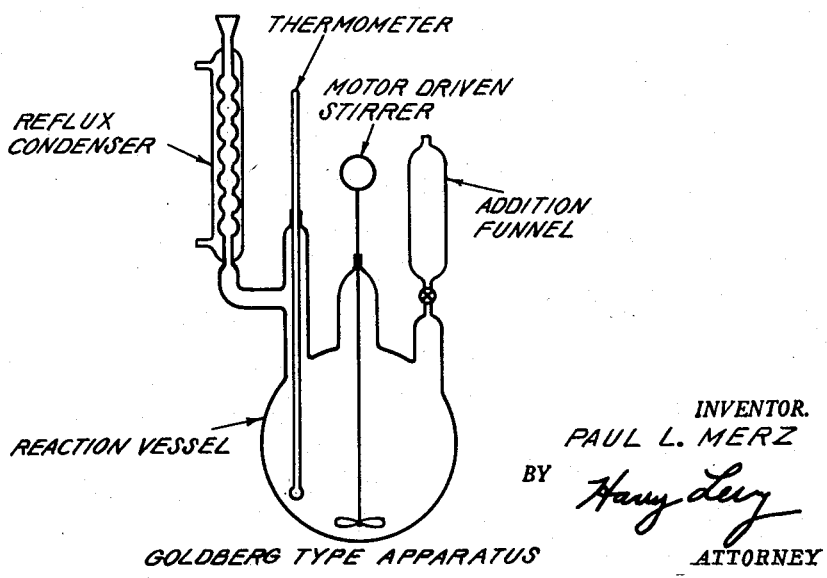
GOLDBERG TYPE APPARATUS
INVENTOR.
PAUL L. MERZ
BY *Harry Levy*
ATTORNEY 2,927,943

Paul L. Merz, Naugatuck, Conn., assignor to United States Rubber Company, New York, N.Y., a corporation of New York Application December 7, 1955, Serial No. 551,579

1 Claim. (Cl. 260—576)

This invention relates to an improvement in the manufacture of p-nitrodiphenylamine.

Previously, a well-known method of synthesizing the aforesaid chemical, attributable to I. Goldberg, is by the reaction of aniline and p-nitrochlorobenzene at a high refluxing temperature in the presence of an alkali-metal carbonate (hydrochloric acid acceptor) and a copper catalyst. Such a procedure is described in British Patent No. 24,091 of 1906, German Patent No. 185,663, and French Patent No. 381,230. The reaction is represented as follows:

$$\phi\text{-NH}_2 + Cl\text{-}\underset{}{\underset{}{\bigcirc}}\text{-NO}_2 + \tfrac{1}{2}K_2CO_3 + Cu_2I_2 \xrightarrow[\text{in the presence of excess of aniline or nitrobenzene}]{\text{reflux 20 hrs. at ca. 190° C.}} \phi\text{-N}\underset{H}{\underset{}{\bigcirc}}\text{-NO}_2 + KCl + \tfrac{1}{2}CO_2 + \tfrac{1}{2}H_2O + Cu_2I_2$$

A disadvantage of the Goldberg synthesis is that the amount of p-nitrodiphenylamine produced is so small (ca. 1% of theory) as to make the process non-commercial. The reason for this has now been found to be the presence during the reaction of the relatively small amount of water formed by the neutralization of the hydrochloric acid which, surprisingly, is not sufficiently removed during the refluxing operation by Goldberg, in spite of the high temperature of reflux. The ½ mole of formed water, about 9 grams in a total reaction mixture of more than 1000 grams, has now been discovered to have an inhibiting effect on the formation of p-nitrodiphenylamine, with consequent reduction in its yield.

I have found that if particular care and attention is given to the removal of the formed water from the zone of reaction, that the yield of the desired chemical is increased about 70 fold. This result could not have been foreseen because in many reactions of this type the presence of a small amount of water is actually helpful.

According to the present invention, the said water is removed continuously as fast as it is formed throughout the course of the reaction, thereby allowing the reaction, once started, to be conducted under substantially anhydrous conditions. This removal is practically achieved by continuously distilling off the water throughout the course of the reaction. Since a simple distillation of this small amount of water from the reaction would be accompanied by a very large amount of the co-distilling aniline solvent, it is advantageous to utilize a fractionating column or a trap of the well known Stark and Dean type for the purpose of separating the water from the refluxing solvent.

These two methods of removing water are compared with the Goldberg type apparatus in the accompanying drawings. In the first, a fractionating column equipped with a distillation head and a take-off condenser is attached to the reaction flask. Advantage is taken of the fact that aniline and water form an azeotrope which is easily distilled off the top of the fractionating column while anhydrous aniline returns to the pot.

Removal of water by a Stark and Dean type trap requires the use of an azeotroping solvent whose specific gravity is significantly different from that of water. The specific gravity of aniline

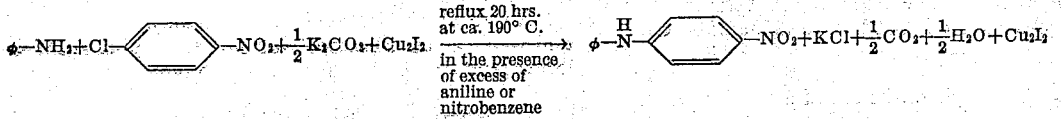

is too close to that of water to permit a clean separation in a Stark and Dean type trap. In order to use a Stark and Dean type trap, a small amount of a suitable inert, azeotroping solvent which possesses a boiling point significantly lower than aniline, is charged into either the reaction mixture or the empty Stark and Dean trap prior to starting the reaction. This Stark and Dean type separator is shown in the attached drawing and is illustrated in Example 3, where benzene was employed as the azeotroping solvent. The water azeotrope distilling up into the vertical condenser, attached to the Stark and Dean trap, condenses and runs back into the trap where the water separates out. It is apparent that both the process employing a fractionating column and that employing a Stark and Dean type trap are capable of continuously removing water from the reaction and are distinct from the Goldberg process which operates under total reflux by merely having a reflux condenser attached to the reaction vessel. Thus, all water is continuously returned to the reaction zone.

The following examples illustrate the invention in more detail, parts being by weight:

Example 1

One mole proportion of p-nitrochlorobenzene, 9 moles of aniline, 0.7 mole of powdered potassium carbonate and 0.0075 mole of cuprous iodide were charged into a two-liter, 3-necked flask equipped with thermometer, motor-driven stirrer, addition funnel, and vertical, air-cooled fractionating column. The top of this air condenser was fitted with a simple distillation head leading to a water-cooled take-off condenser. The reaction mixture was heated to between 184° C. and 188° C. for 21 hours. Boiling at this temperature was sufficiently heavy to drive off the lower boiling fractions (B.P. 150° C.–180° C.) which consisted of aniline-water azeotrope, which as stated above is freed of water and the water-free aniline returned to the reaction mixture.

At the end of 21 hours the reaction mixture was cooled and then filtered to remove the inorganic salts. The filtrate was distilled to recover any excess of unreacted aniline and the distillation residue then steam-blown to remove the unreacted p-nitrochlorobenzene and any residual aniline. The recovered p-nitrochlorobenzene amounted to 38 g., i.e., 24% of the original charge. The residue consisted of hard green crystalline lumps which upon recrystallization from hot methanol yield 156 g. (73% of theory) of moderately pure (M.P. 122° C.–129° C.) p-nitrodiphenylamine.

The Example 2 below represents Goldberg's procedure in which his mixture is simply heated under reflux in a reflux apparatus, no provision being made to accommodate the removal of water, because there was no recognition of the importance of the presence or absence of the small amount of water. A priori, there is no obvious reason why the relatively insignificant amount of water must be removed, since the reaction is irreversible because of the liberation of the carbon dioxide; nor that the small amount of water would be sufficient to inhibit the condensation.

Example 2

A mixture identical with the above (i.e., 1 mole of p-nitrochlorobenzene, 9 moles of aniline, 0.7 mole of potassium carbonate and 0.0075 mole cuprous iodide) was heated in a reflux apparatus at 189° C., as described by Goldberg, for 22 hours under total reflux. The reaction mixture was worked up in exactly the same way as the preceding example. After filtering off the inorganics, distilling off the excess aniline, and steam distilling off the unchanged p-nitrochlorobenzene, only an insignificant quantity of solid residue remained. Upon recrystallizing the residue from hot $CH_3OH$ a small amount (ca. 1% of theory) of moderately pure (M.P. 125° C.–134° C.) p-nitrodiphenylamine was obtained.

The conditions and the proportions of ingredients cited in the foregoing reaction can be varied over a considerable range without unduly affecting the reaction. Thus the mole ratio of aniline/p-nitrochlorobenzene may be varied from 1 to 10, per mole of the latter, and the mole ratio of potassium carbonate/p-nitrochlorobenzene may vary from ½ to 1, per mole of the latter. An even larger excess of potassium carbonate is not detrimental. Any suitable copper salt, such as cuprous iodide, cuprous chloride or copper sulfate, may be used. The reaction temperature can be varied from 170° C. to 200° C. At temperatures below 170° C. the reaction rate is too slow to be practical. At reaction temperatures above 200° C. impure reaction products which are difficult to purify are obtained. Preferred temperatures are in the range from about 180° C. to about 190° C.

Example 3

Following is an example of the use of a smaller amount of aniline:

One mole of p-nitrochlorobenzene, 1½ moles of aniline, ½ mole of anhydrous powdered potassium carbonate and 0.015 mole of cuprous chloride were charged into a 500 cc., 3-necked flask equipped with thermometer, motor-driven horseshoe stirrer, Stark and Dean trap and reflux condenser. The reaction mixture was heated on a Wood's metal bath and sufficient benzene was added to give a reflux temperature of 185° C. The theoretical amount of water was evolved in 26 hours' time. The reaction mixture was then cooled and the crude p-nitrodiphenylamine isolated by the procedure described in Examples 1 and 2. 157.5 g. (74% of theory) of p-nitrodiphenylamine, M.P. 115° C.–125° C. were obtained. This product was purified by vacuum distillation; B.P. 181° C.–200° C./0.3 mm. The yield of pure p-nitrodiphenylamine, M.P. 130° C.–133° C., amounted to 134 g. or an 85% recovery from the crude material.

As mentioned above, maintenance of anhydrous conditions through removing the water formed by the reaction of HCl with $K_2CO_3$, is absolutely necessary. In general, however, the removal of water should not be carried much beyond the theoretical point, and thus the reaction is usually stopped when approximately ½ mole of water per mole of p-nitrochlorobenzene have been evolved.

Having thus described my invention, what I claim and desire to protect by Letters Patent is:

In a process for the preparation of p-nitrodiphenylamine by subjecting a reaction mixture in which the active ingredients consist essentially of from 1 to 10 moles of aniline, 1 mole of p-nitrochlorobenzene, and ½ to 1 mole of potassium carbonate as a hydrochloric acid acceptor together with a catalytic amount of copper salt to reaction at a temperature in the range of 170° C. to 200° C., the improvement which comprises conducting said reaction under substantial anhydrous conditions by removing all water, including the water formed by the neutralization of the hydrochloric acid with said potassium carbonate, from the reaction zone throughout the course of the reaction by continuously distilling off said water as an azeotrope with an azeotroping agent selected from the group consisting of aniline and benzene.

References Cited in the file of this patent

UNITED STATES PATENTS

| Number | Name | Date |
|---|---|---|
| 1,840,576 | Frei | Jan. 12, 1932 |
| 2,028,074 | Lauter | Jan. 14, 1936 |
| 2,476,170 | Widiger | July 12, 1949 |
| 2,656,389 | Johannesen | Oct. 20, 1953 |
| 2,700,060 | Cherlow et al. | Jan. 18, 1955 |

FOREIGN PATENTS

| Number | Country | Date |
|---|---|---|
| 185,663 | Germany | Apr. 22, 1906 |
| 381,230 | France | Nov. 3, 1906 |